US010205853B2

(12) United States Patent
Hayashi et al.

(10) Patent No.: US 10,205,853 B2
(45) Date of Patent: Feb. 12, 2019

(54) AUTHENTICATION APPARATUS, IMAGE FORMING APPARATUS, AUTHENTICATION METHOD, AND IMAGE FORMING METHOD

(71) Applicant: FUJI XEROX CO., LTD., Tokyo (JP)

(72) Inventors: Manabu Hayashi, Kanagawa (JP); Masafumi Ono, Kanagawa (JP); Naoya Nobutani, Kanagawa (JP); Kunitoshi Yamamoto, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/921,334

(22) Filed: Oct. 23, 2015

(65) Prior Publication Data
US 2016/0330346 A1 Nov. 10, 2016

(30) Foreign Application Priority Data
May 8, 2015 (JP) ................................ 2015-095652

(51) Int. Cl.
*H04N 1/44* (2006.01)
*H04N 1/00* (2006.01)
*H04N 5/33* (2006.01)
*H04L 29/06* (2006.01)

(52) U.S. Cl.
CPC ......... *H04N 1/442* (2013.01); *H04L 63/0861* (2013.01); *H04N 1/00251* (2013.01); *H04N 1/00336* (2013.01); *H04N 1/00411* (2013.01); *H04N 1/00891* (2013.01); *H04N 5/332* (2013.01); *H04N 2201/0094* (2013.01)

(58) Field of Classification Search
None
See application file for complete search history.

(56) References Cited

U.S. PATENT DOCUMENTS

| 2007/0242887 | A1 | 10/2007 | Matsushita et al. |
| 2013/0047232 | A1* | 2/2013 | Tuchman ............... H04L 9/3226 726/7 |
| 2013/0208103 | A1* | 8/2013 | Sands ...................... G06F 21/31 348/78 |
| 2014/0104631 | A1* | 4/2014 | Baba .................. H04N 1/00323 358/1.13 |

(Continued)

FOREIGN PATENT DOCUMENTS

| JP | 2002-111924 A | 4/2002 |
| JP | 2003-132339 A | 5/2003 |

(Continued)

OTHER PUBLICATIONS

Communication dated Nov. 27, 2018, from Japanese Patent Office in counterpart application No. 2015-095652.

*Primary Examiner* — Lennin R Rodriguezgonzalez
(74) *Attorney, Agent, or Firm* — Sughrue Mion, PLLC

(57) ABSTRACT

An authentication apparatus includes an imaging unit that captures a face image of a user, an authenticating unit that authenticates the user using the face image of the user captured by the imaging unit, a display unit that displays failure information if authentication of the user by the authenticating unit is unsuccessful, a departure detecting unit that detects a departure of the user, and a stopping unit that causes the display unit to stop displaying the failure information if the departure detecting unit detects the departure of the user.

23 Claims, 11 Drawing Sheets

(56) References Cited

U.S. PATENT DOCUMENTS

| | | |
|---|---|---|
| 2015/0047018 A1 | 2/2015 | Ono et al. |
| 2015/0058971 A1* | 2/2015 | Mori ................. G06F 21/31 |
| | | 726/17 |
| 2015/0062612 A1* | 3/2015 | Nishii ................ G06F 3/1222 |
| | | 358/1.14 |
| 2016/0227106 A1* | 8/2016 | Adachi ................ H04N 7/181 |

FOREIGN PATENT DOCUMENTS

| | | |
|---|---|---|
| JP | 2003141088 A | 5/2003 |
| JP | 2007047931 A | 2/2007 |
| JP | 2009-64140 A | 3/2009 |
| JP | 2010246132 A | 10/2010 |
| JP | 2012089140 A | 5/2012 |
| JP | 2013-30078 A | 2/2013 |
| JP | 2015035180 A | 2/2015 |

\* cited by examiner

AUTHENTICATION APPARATUS, IMAGE FORMING APPARATUS, AUTHENTICATION METHOD, AND IMAGE FORMING METHOD

CROSS-REFERENCE TO RELATED APPLICATIONS

This application is based on and claims priority under 35 USC 119 from Japanese Patent Application No. 2015-095652 filed May 8, 2015.

BACKGROUND

Technical Field

The present invention relates to an authentication apparatus, an image forming apparatus, an authentication method, and an image forming method.

Summary

According to an aspect of the invention, there is provided an authentication apparatus. The authentication apparatus includes an imaging unit that captures a face image of a user, an authenticating unit that authenticates the user using the face image of the user captured by the imaging unit, a display unit that displays failure information if authentication of the user by the authenticating unit is unsuccessful, a departure detecting unit that detects a departure of the user, and a stopping unit that causes the display unit to stop displaying the failure information if the departure detecting unit detects the departure of the user.

BRIEF DESCRIPTION OF THE DRAWINGS

Exemplary embodiments of the present invention will be described in detail based on the following figures, wherein.

DETAILED DESCRIPTION

Figure 1:
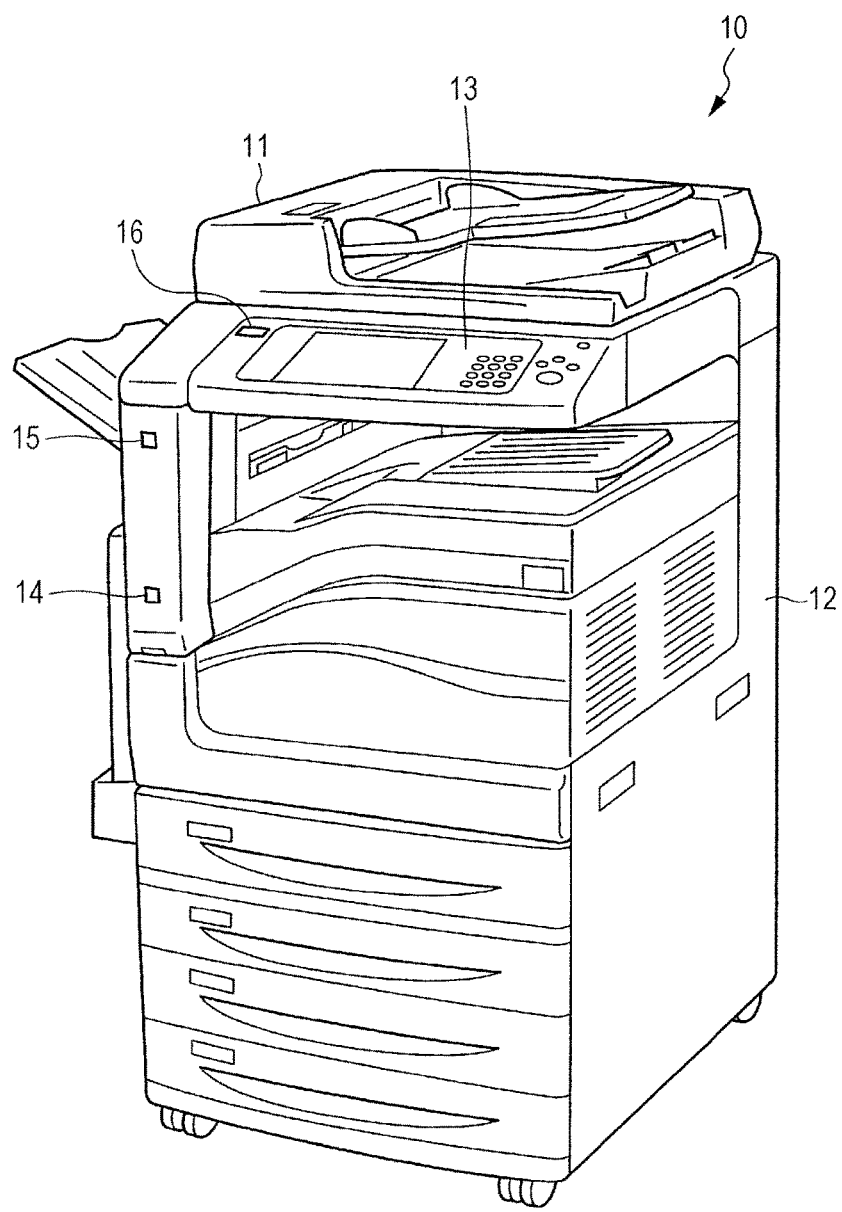
FIG. 1 is a perspective view of an image forming apparatus.

Exemplary embodiments of the invention are described with reference to the drawings.
First Exemplary Embodiment FIG. 1 is a perspective view of an image forming apparatus 10 of a first exemplary embodiment. The image forming apparatus 10 is a multi-function apparatus having a scanning function, a printing function, a copying function, and a facsimile function.

The image forming apparatus 10 includes a scanner 11, a printer 12, and a user interface (UI) 13. The scanner 11 reads an image formed on an original document. The printer 12 prints an image on a recording material. The user interface 13 receives an operation (instruction) from a user and displays a variety of information to the user when the user operates the image forming apparatus 10.

The scanner 11 of the first exemplary embodiment is mounted on top of the printer 12. The user interface 13 is attached to the scanner 11. The user interface 13 is arranged on the front side of the image forming apparatus 10 (the scanner 11) in front of which the user stands to use the image forming apparatus 10. The user interface 13 faces upward such that the user standing in front of the front side of the image forming apparatus 10 looks downward on the user interface 13 from above while operating the user interface 13.

The image forming apparatus 10 further includes a pyroelectric sensor 14, a first camera 15, and a second camera 16. The pyroelectric sensor 14 and the first camera 15 are disposed on the front-left side of the printer 12. The first camera 15 is disposed above the pyroelectric sensor 14. The second camera 16 as an example of an imaging unit is disposed on the left side of the user interface 13 and looks upward.

The pyroelectric sensor 14 has a function of detecting the movement of a moving body including the user in front of the image forming apparatus 10. The first camera 15 is a video camera, and has a function of capturing an image of an area in front of the front side of the image forming apparatus 10. The second camera 16 is also a video camera and has a function of capturing the image of an area above the top side of the image forming apparatus 10. Each of the pyroelectric sensor 14, the first camera 15, and the second camera 16 functions as a departure detecting unit.

Figure 2:
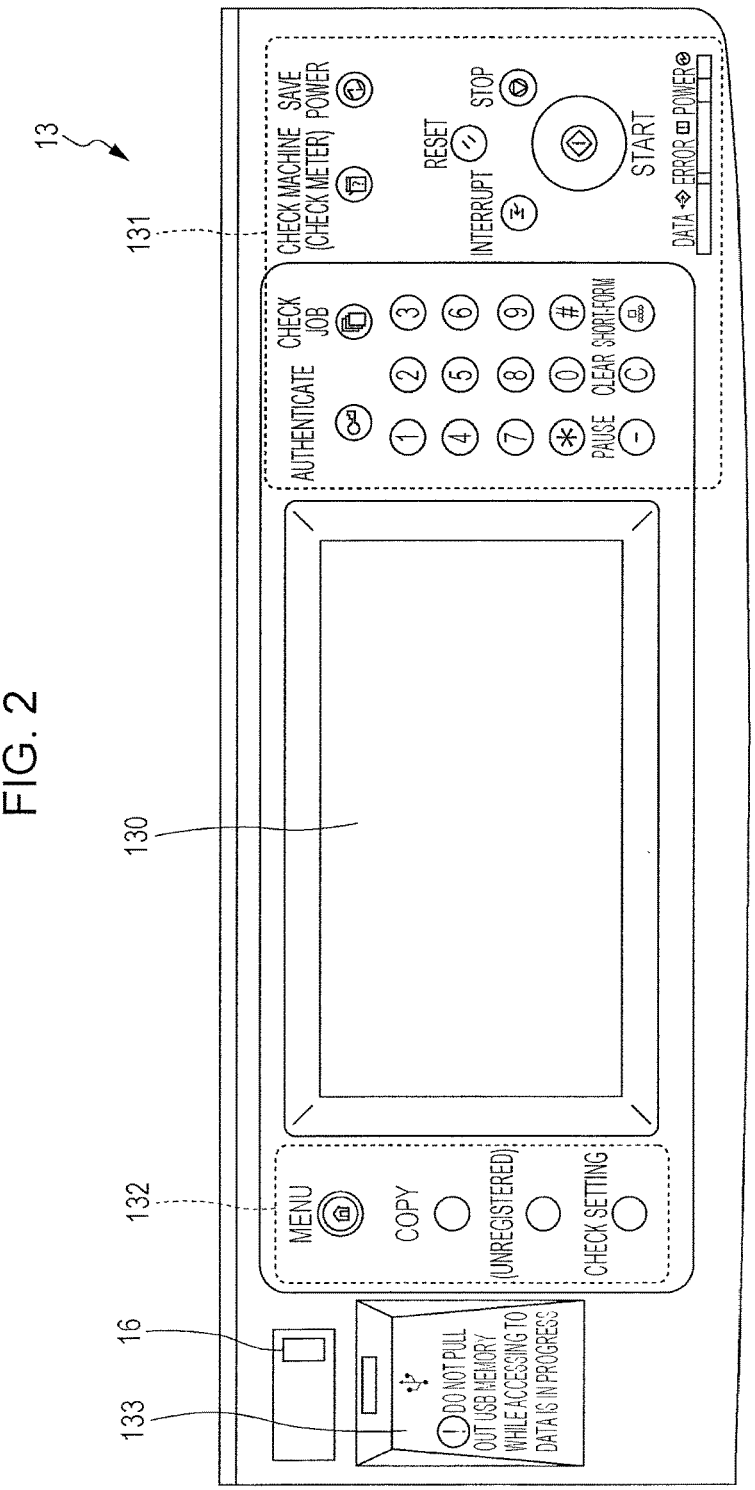
FIG. 2 is a top view of a user interface.

FIG. 2 is a top view of the user interface 13 of FIG. 1. FIG. 2 also illustrates the second camera 16 arranged on the user interface 13.

The user interface 13 includes a touch panel 130, a first operation button group 131, a second operation button group 132, and a universal serial bus (USB) memory socket 133. The first operation button group 131 is disposed on the right side of the touch panel 130. The second operation button group 132, the USB memory socket 133, and the second camera 16 are disposed on the left side of the touch panel 130.

The touch panel 130 as an example of a display displays information to the user using an image, and has a function of receiving an input from the user. The first operation button group 131 and the second operation button group 132 also have a function of receiving an input from the user. The USB memory socket 133 has a function of receiving a USB memory from the user.

The second camera 16 disposed on the user interface 13 is arranged at a location where the image of the face of the user using the image forming apparatus 10 is captured. The image (including the image of the face of the user) captured by the second camera 16 is displayed on the touch panel 130.

Figure 3:
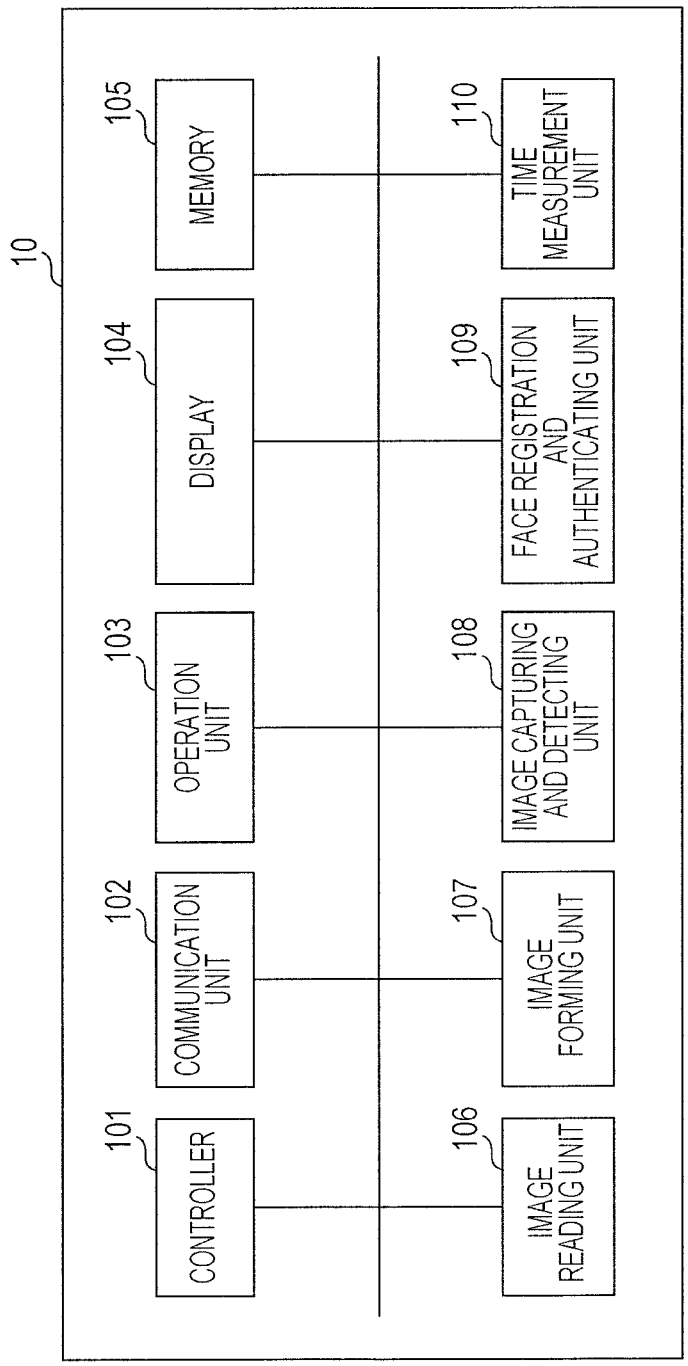
FIG. 3 is a block diagram of the image forming apparatus.

FIG. 3 is a block diagram illustrating the image forming apparatus 10. The image forming apparatus 10 includes a controller 101, a communication unit 102, an operation unit 103, a display 104, a memory 105, an image reading unit 106, an image forming unit 107, an image capturing and detecting unit 108, a face registration and authenticating unit 109, and a time measurement unit 110.

The controller 101 functioning as a stopping unit, a controller, and a changing unit includes a central processing unit (CPU), and a memory, and controls the elements of the image forming apparatus 10. The CPU executes a program stored on a storage device or the memory 105. The memory may include a read-only memory (ROM) or a random-access memory (RAM). The ROM pre-stores a program or data. The RAM temporarily stores a program or data, and serves as a working area where the CPU executes the program.

The communication unit 102 is a communication interface to be connected to a communication network (not illustrated). The communication unit 102 communicates with a client apparatus or another image forming apparatus (both apparatuses not illustrated) via the communication network.

The operation unit 103 inputs to the controller 101 information responsive to an operation of the user. In this case, the operation unit 103 is implemented using the touch panel 130, the first operation button group 131 or the second operation button group 132 disposed on the user interface 13.

The display 104 displays a variety of information to the user. The display 104 is implemented using the touch panel 130 disposed on the user interface 13.

The memory 105 is a hard disk, for example, and stores a variety of programs and data to be used by the controller 101.

The image reading unit 106 reads an image of an original document, and generates image data. The image reading unit 106 in this case is implemented by the scanner 11.

The image forming unit 107 forms an image responsive to image data on a recording material sheet, such as a paper sheet. In this case, the image forming unit 107 is implemented by the printer 12. The image forming unit 107 may form image through an electrophotographic system or another system.

The image capturing and detecting unit 108 captures or detects a imaging target. The image capturing and detecting unit 108 may be implemented by the pyroelectric sensor 14, the first camera 15 or the second camera 16.

The face registration and authenticating unit 109 as an example of an authenticating unit or a face detecting unit registers the face image of a user in advance who is to be permitted to use the image forming apparatus 10. In the registration, the face image of the user is captured and a feature quantity is extracted from the captured face image. The identification (ID) of the user, the face image of the user, and the feature quantity extracted from the face image of the user are stored in an associated state. When the user uses the image forming apparatus 10, the face registration and authenticating unit 109 authenticates the user using the face image. In the authentication, the face image of the user is captured, and the feature quantity is extracted from the captured face image. The image forming apparatus 10 determines whether the feature quantity obtained presently matches the registered feature quantity. If the two feature quantities match, the user is permitted to use the image forming apparatus 10. If there is no match in the feature quantities, the use of the image forming apparatus 10 is limited or entirely prohibited.

The time measurement unit 110 is a timer, for example, and measures time in response to an instruction from the controller 101.

The image forming apparatus 10 performs a scanning operation, a copying operation, a printing operation, a facsimile transmission operation, and a facsimile reception operation. The scanning operation reads an image from an original document, and generates image data. The scanning operation is performed by the image reading unit 106. The copying operation reads an image from an original document, generates image data, and forms an image on a recording material based on the image data. The copying operation is performed by the image reading unit 106 and the image forming unit 107. The printing operation forms an image on a recording material based on image data received from a client apparatus external to the image forming apparatus 10. The printing operation is performed by the communication unit 102 and the image forming unit 107. The facsimile transmission operation reads an image from an original document, generates image data, and transmits the generated image data to a facsimile apparatus via the communication unit 102. The facsimile transmission operation is performed by the image reading unit 106 and the communication unit 102. The facsimile reception operation forms an image on a recording material based image data received from a facsimile apparatus. The facsimile reception is performed by the communication unit 102 and the image forming unit 107.

Figure 10:
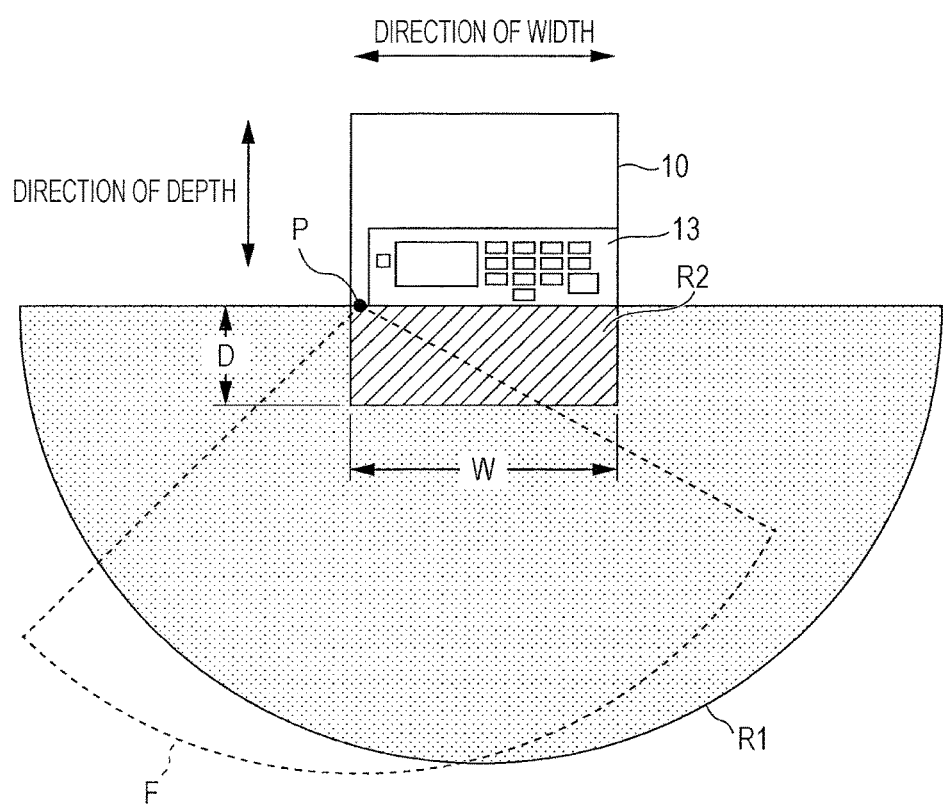
FIG. 10 illustrates an area where the image forming apparatus detects the presence of a person.

FIG. 10 illustrates an area where the image forming apparatus 10 detects the presence of a person. FIG. 10 is a plan view of the image forming apparatus 10 and an area surrounding the image forming apparatus 10 viewed from above in the height direction of the image forming apparatus 10.

Referring to FIG. 10, a sensing area F of the pyroelectric sensor 14 (see FIG. 1) is set up in front of the image forming apparatus 10, and has a generally sector shape if viewed from above in height. When a person intending to use the image forming apparatus 10 approaches the image forming apparatus 10, the person enters the sensing area F first.

An approach sensing area R1 of FIG. 10 is formed in front of the image forming apparatus 10 and has a generally sector shape in a plan view if viewed from above in the direction of height. The approach sensing area R1 is set up to generally include the sensing area F. The person who approaches the image forming apparatus 10 enters the approach sensing area R1. A location labeled "P" in FIG. 10 where the first camera 15 is arranged is referred to as the location of the image forming apparatus 10. The approach sensing area R1 is a sector having a central angle of 180 degrees (semi-circle), but the central angle may be an angle other than 180 degrees. However, the first camera 15 is arranged so that the first camera 15 has at least the entire approach sensing area R1 as an imaging area.

A presence sensing area R2 is set up in front of the image forming apparatus 10 and has a rectangular shape in a plan view if viewed from above in the direction of height. The rectangular area has a length W in the direction of width of the image forming apparatus 10 and a length D in the direction of depth of the image forming apparatus 10. The length W in the direction of width of the presence sensing area R2 is approximately equal to the length of the image forming apparatus 10 in the direction of width thereof. The presence sensing area R2 is closer to the image forming apparatus 10 than the approach sensing area R1. For this reason, the entire presence sensing area R2 is set up to be enclosed in the approach sensing area R1. The user of the image forming apparatus 10 enters the presence sensing area R2, and then stays within the presence sensing area R2 to perform an operation using the user interface 13.

The controller 101 senses a person within each of the approach sensing area R1 and the presence sensing area R2 by analyzing the image captured by the first camera 15. The approach sensing area R1 and the presence sensing area R2 are not necessarily set up at a precision level exactly as illustrated FIG. 10, and it is sufficient enough if the approach sensing area R1 and the presence sensing area R2 are set up at a precision level as high as the level estimated from the image captured by the first camera 15.

Figure 11:
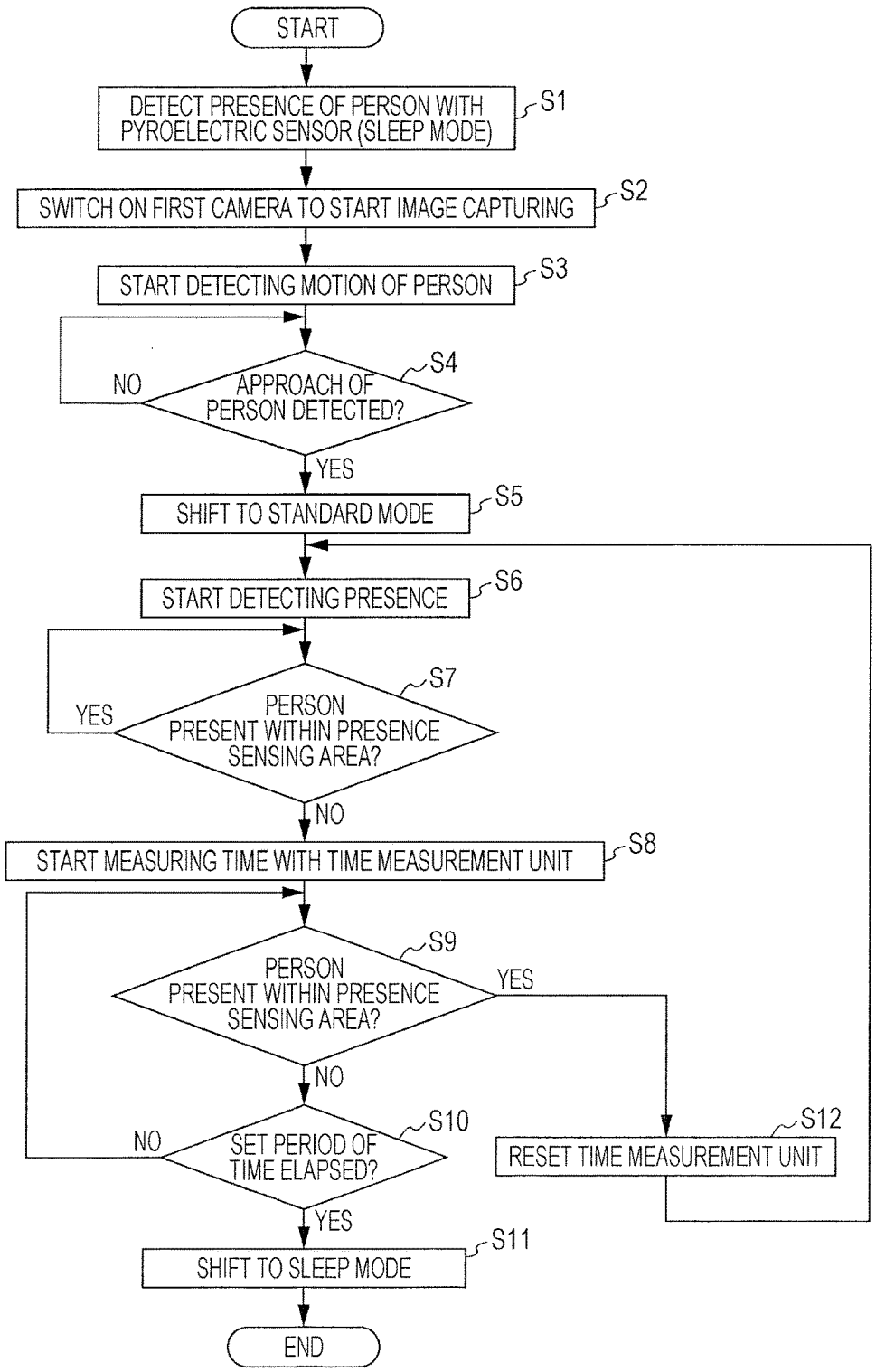
FIG. 11 is a flowchart illustrating a process control flow of a mode of the image forming apparatus.

FIG. 11 is a flowchart illustrating the process flow of controlling the mode of the image forming apparatus 10.

With the image forming apparatus 10 operating in the sleep mode, the controller 101 monitors the sensing results of the quantity of infrared light with the pyroelectric sensor 14, and determines whether a person is present within the sensing area F. If a person enters the sensing area F, the controller 101 senses the presence of the person within the sensing area F in response to the sensing results of the pyroelectric sensor 14 (step S1).

If the presence of the person is sensed within the sensing area F, the controller 101 starts supplying power to the first camera 15 and causes the first camera 15 to begin photographing the approach sensing area R1 (step S2). When the first camera 15 starts photographing, the controller 101 analyzes the image captured from the first camera 15, and then starts sensing the movement of the person by analyzing the image captured from the first camera 15 (step S3).

In the operation of sensing the movement of the person in step S3, the controller 101 estimates the distance from the image forming apparatus 10 to the person while calculating a motion vector indicating the movement of the person. The operation of sensing the movement of the person may be a related art technique. For example, the controller 101 estimates the distance from the image forming apparatus 10 to the person based on the magnitude of a part of the body of the person detected from the captured image. The controller 101 also compares sequentially multiple frames of the captured images by performing a framing operation on the captured images from the first camera unit 15. In this case, the controller 101 senses the toe as the part of the body of the person, and calculates the motion vector by analyzing the movement of the sensed part. For example, the controller 101 corrects the captured image from the first camera unit 15 (into a plan view form), and then senses the movement of the person.

The controller 101 determines whether the approach of the person is detected within the approach sensing area R1 (step S4). The controller 101 may determine that the person is within the approach sensing area R1, and that the person moves toward the image forming apparatus 10. The controller 101 then determines that the approach of the person has been sensed (yes branch from step S4).

Note that during the period throughout which the pyroelectric sensor 14 senses the presence of the person, the controller 101 performs the operation to sense the movement of the person, and repeats the operation in step S4 to determine whether the person approaches (no branch from step S4).

In the yes branch from step S4, the controller 101 shifts the image forming apparatus 10 from the sleep mode to the standard mode (step S5). The controller 101 instructs the image forming apparatus 10 to supply power to each unit of the image forming apparatus 10 in response to the standard mode and starts up each unit of the image forming apparatus 10. The controller 101 starts supplying power to the second camera 16 and causes the second camera 16 to start photographing the presence sensing area R2.

The controller 101 does not shift the image forming apparatus 10 to the standard mode immediately when the presence of a person has been sensed within the approach sensing area R1 but shifts the image forming apparatus 10 to the standard mode when the approach of the person to the image forming apparatus 10 has been sensed. This reduces the possibility that the image forming apparatus 10 is shifted to the standard mode when the person simply passes through the approach sensing area R1.

The controller 101 starts an operation to sense the presence (staying) of the person within the presence sensing area R2 (step S6). The controller 101 senses a part of the body of the person by analyzing the captured image from the first camera unit 15, and senses the presence of the person within the presence sensing area R2 in accordance with the location and the size of the sensed part. For example, the controller 101 estimates the distance from the image forming apparatus 10 to the person in response to the size of the detected part of the body, and identifies a direction to the location of the person based on the location of the sensed part of the body.

The controller 101 determines whether the person is present within the presence sensing area R2 (step S7). If the controller 101 determines that the person is present within the presence sensing area R2 (yes from step S7), processing returns to step S6. The controller 101 repeats the operation to sense the presence of the person within the presence sensing area R2 with the image forming apparatus 10 set in the standard mode until the presence of the person is no longer sensed within the presence sensing area R2.

The person may move out of the presence sensing area R2 possibly because of the completion of the job with the image forming apparatus 10. In such a case, the controller 101 determines that the person is no longer present within the presence sensing area R2 (no branch from step S7). The controller 101 causes the time measurement unit 110 to start measuring time (step S8). In other words, using the time measurement unit 110, the controller 101 measures elapsed time from when the person is no longer present within the presence sensing area R2.

The controller 101 determines whether a person is present within the presence sensing area R2 (step S9). Once the person has been no longer present within the presence sensing area R2, the controller 101 determines in the operation of step S9 whether the presence of the person is detected again. For example, the person may gradually go away from the image forming apparatus 10 and no person may be present within the presence sensing area R2. The controller 101 then determines that the answer to the operation in step S9 is "no", and proceeds to step S10.

The controller 101 determines whether the time set in the time measurement unit 110 has elapsed (step S10). The set time may be 1 minute, for example. Time different from 1 minute may also be set. If the controller 101 determines that the set time has not elapsed (no branch from step S10), processing returns to step S9. More specifically, the controller 101 determines in each of the steps S9 and S10 whether the period throughout which no person is present within the presence sensing area R2 is equal to the set time.

In response to the affirmative determination (yes branch from step S10), the controller 101 shifts the image forming apparatus 10 from the standard mode to the sleep mode (step S11). In this operation, the controller 101 instructs the image forming apparatus 10 to supply power for the sleep mode to each unit of the image forming apparatus 10 and suspends the operation of each unit in the image forming apparatus 10 that is to be suspended during the sleep mode. When the presence of the person is no longer sensed within the sensing area F, the controller 101 suspends the operation of the first camera unit 15.

The controller 101 may sense the presence of a person again before the elapse of the set time from when the person is no longer present within the presence sensing area R2 after the start of the time measurement of the time measurement unit 110. In such a case, the controller 101 determines that the determination in step S9 is affirmative (yes), and processing proceeds to step S12. The controller 101 stops the time measurement of the time measurement unit 110 and resets the time measurement unit 110 (step S12). The controller 101 stops shifting to the sleep mode initiated by the no-presence of the person within the presence sensing area R2, and then returns to step S6. In other words, the controller 101 again executes the operation that applies to the case when the person is present within the presence sensing area R2.

It is assumed herein that the same person has returned back. If a different person comes into the presence sensing area R2, the controller 101 also determines that the determination in step S9 is affirmative (yes).

A face authentication process to be performed by a user who is going to use the image forming apparatus 10 is described below.

Figure 4:
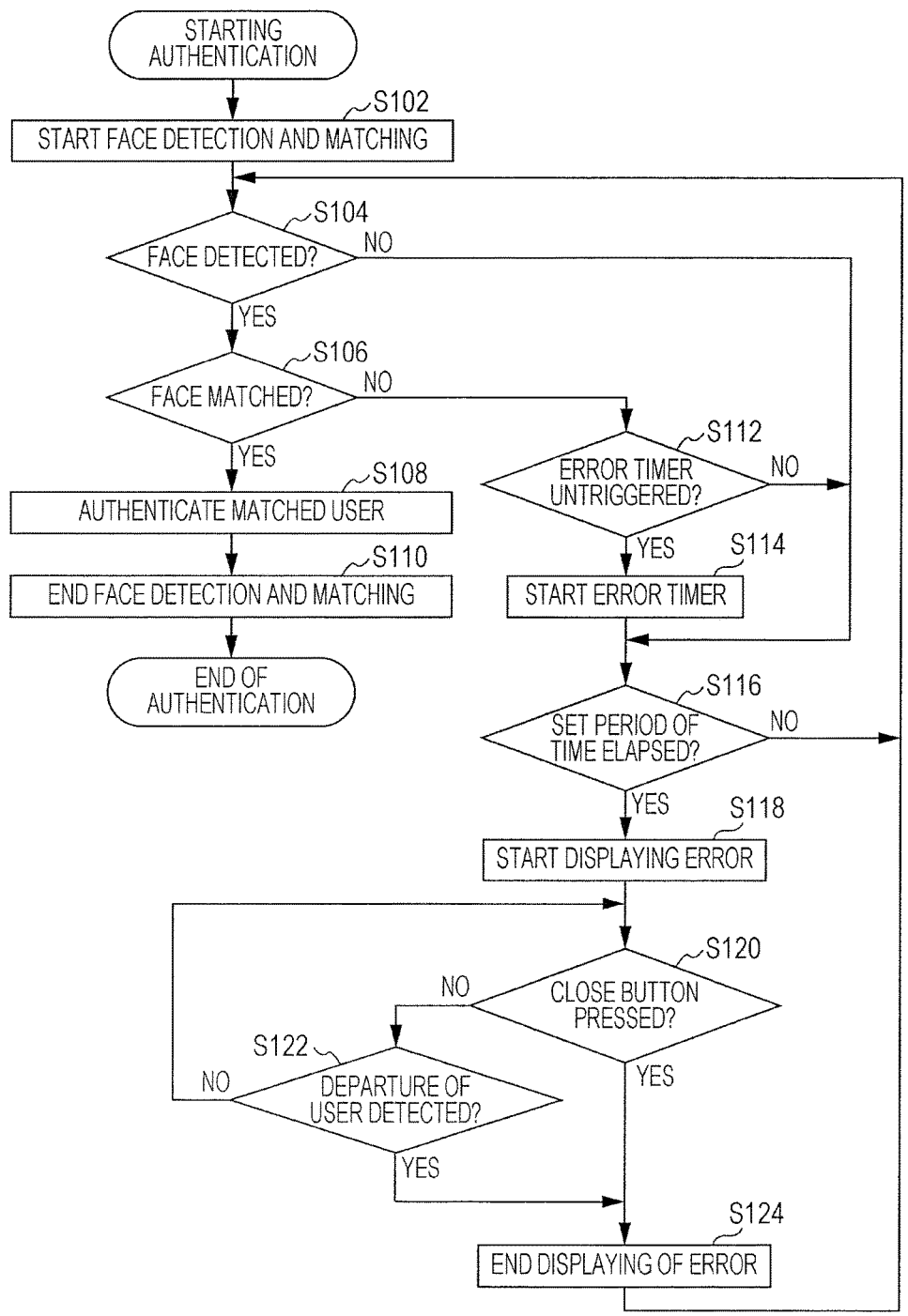
FIG. 4 is a flowchart illustrating a face authentication process of a first exemplary embodiment.

FIG. 4 is a flowchart illustrating the face authentication process of the first exemplary embodiment. The face authentication process is performed by the controller 101 and the face registration and authenticating unit 109 in the image forming apparatus 10.

The pyroelectric sensor 14 may detect a person (user) in step S1 (see FIG. 11), the first camera 15 may be started in step S2, and the image forming apparatus 10 may shift from the sleep mode to the standard mode in step S5. The face authentication process starts in response to the detection of the presence of the person in step S6, followed by starting a face detection and matching process on the basis of the image captured by the second camera 16 (step S102). In step S102, the image captured by the second camera 16 (hereinafter referred to as a camera image) is displayed on the touch panel 130 in the user interface 13. If the face of the user is present within the sensing area of the second camera 16, the camera image includes the face of the user.

The image forming apparatus 10 determines whether the face of the user has been detected (step S104). In response to a non-affirmative determination in step S104 (no branch from step S104), processing proceeds to step S116. In response to an affirmative determination in step S104 (yes branch from step S104), the image forming apparatus 10 checks the feature quantity of the detected face against the feature quantity of the registered face to determine whether there is a match (as to whether face matching is successful or not) (step S106). In response to an affirmative determination (yes) in step S106, the image forming apparatus 10 authenticates the user as a matched user (step S108), and completes the face detection and matching process (step S110). The image forming apparatus 10 thus ends the face authentication process.

In response to a non-affirmative determination (no) in step S106, the image forming apparatus 10 determines whether an error timer using the time measurement unit 110 is untriggered (step S112). In response to an affirmative determination (yes) in step S112, the image forming apparatus 10 starts the error timer with a set period of time (first set time T1) (step S114), and proceeds to step S116. On the other hand, in response to a non-affirmative determination (no) in step S112, processing proceeds to step S116.

The image forming apparatus 10 determines whether the set period of time of the started timer (first set time T1) has elapsed (step S116). In response to a non-affirmative determination (no) in step S116, processing returns to step S104 to repeat the process. In response to an affirmative determination (yes) in step S116, the image forming apparatus 10 causes the touch panel 130 to display an error indication (step S118).

The image forming apparatus 10 determines whether the user has pressed a close button with the error indication displayed (step S120). In response to a non-affirmative determination (no) in step S120, the image forming apparatus 10 determines whether a departure of the user from the area in front of the image forming apparatus 10 has been detected (step S122). The detection of the departure of the user in step S122 may be carried out in response to detection results by the pyroelectric sensor 14, imaging results by the first camera 15, and imaging results by the second camera 16. In response to a non-affirmative determination (no) in step S122, processing returns to step S120 to continue the process.

On the other hand, in response to an affirmative determination (yes) in step S120, or in response to an affirmative determination (yes) in step S122, the image forming apparatus 10 causes the touch panel 130 to stop displaying the error indication (step S124). Processing returns to step S104 to continue the process.

A variety of display screens presented on the touch panel 130 in the face authentication process of the first exemplary embodiment are described below.

Figure 5:
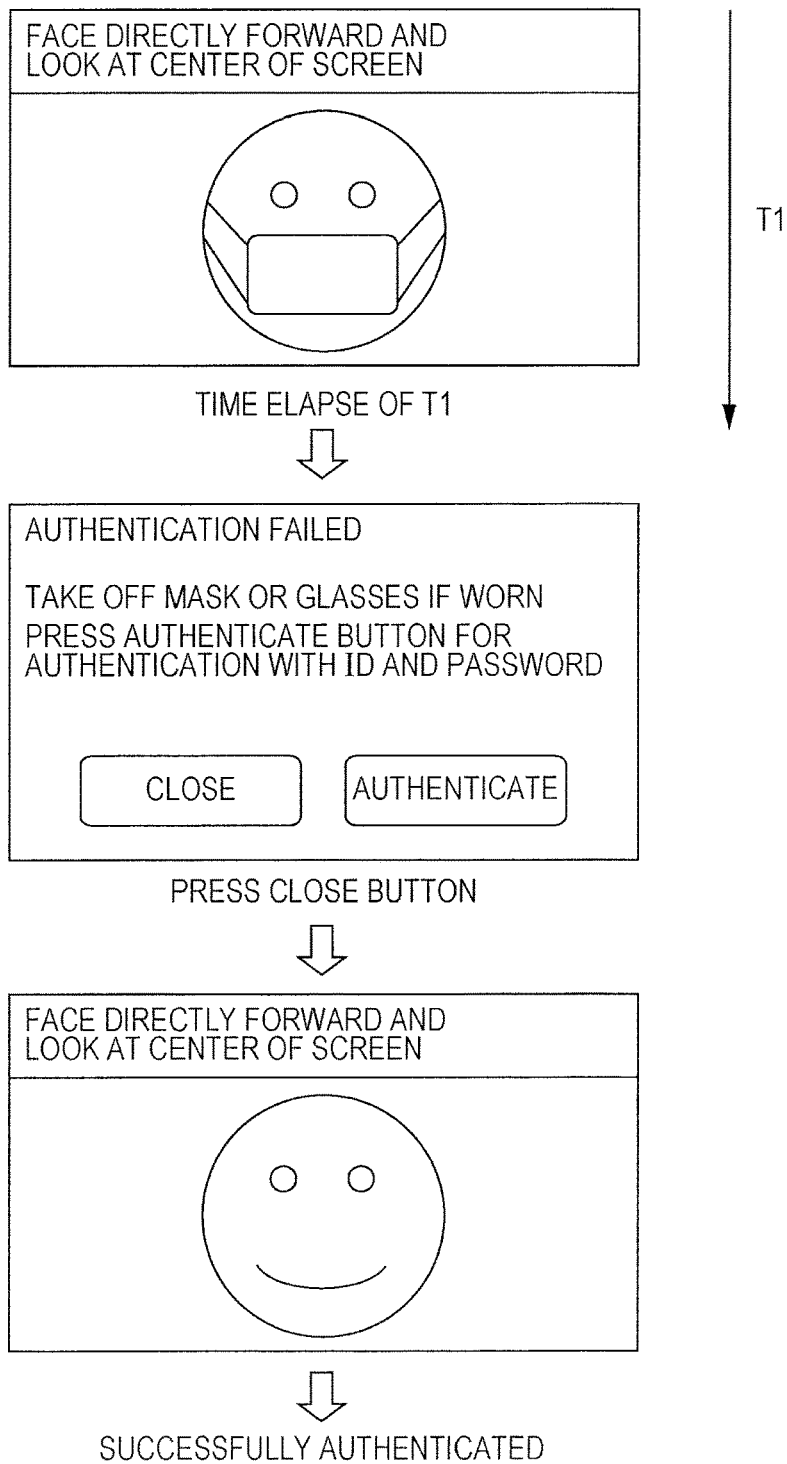
FIG. 5 illustrates an example of display screens in the face authentication process of the first exemplary embodiment.

FIG. 5 illustrates an example of display screens in the face authentication process of the first exemplary embodiment. Referring to FIG. 5, a user who has registered his or her face (face registered) requests the face authentication with a mask worn.

The first display screen from the top of FIG. 5 is displayed on the touch panel 130 in step S102. The first display screen displays a message to the user on the upper portion thereof, and a camera image captured by the second camera 16 on the lower portion thereof. The message here reads "face directly forward and look at center of screen". The camera image indicates the face of the user with the mask worn. Since the face is not detected from the camera image (because of the worn mask), the determination in step S104 is non-affirmative (no).

The second display screen from the top of FIG. 5 is an error screen (error indication) displayed on the touch panel 130 in step S118 if the first set time T1 preset by the error timer in step S114 has elapsed, and the determination in step S116 is affirmative (yes). The screen displays an error message to the user on the upper portion thereof, and a "close button" on the left-hand side of the lower portion thereof and a "authenticate button" on the right-hand side of the lower portion thereof. The error messages herein reads "authentication failed. Take off mask or glasses if worn. Press authenticate button for authentication with ID and password." If the close button is pressed by the user, the determination in step S120 is affirmative (yes).

The third display screen from the top of FIG. 5 is a screen displayed on the touch panel 130 in step S124 (subsequent to the end of the displaying of the error indication) after an affirmative determination (yes) in step S120. The screen displays the same message to the user as the message displayed on the first screen of FIG. 5 on the upper portion thereof and a camera image captured by the second camera 16 on the lower portion thereof. However, the user presses the close button on the second screen of FIG. 5 with the mask removed, and the camera face is the face of the user with the mask removed.

An affirmative determination (yes) in step S104 in this case is followed by an affirmative determination (yes) in step S106. The user is thus successfully authenticated, and is permitted to use the image forming apparatus 10.

Figure 6:
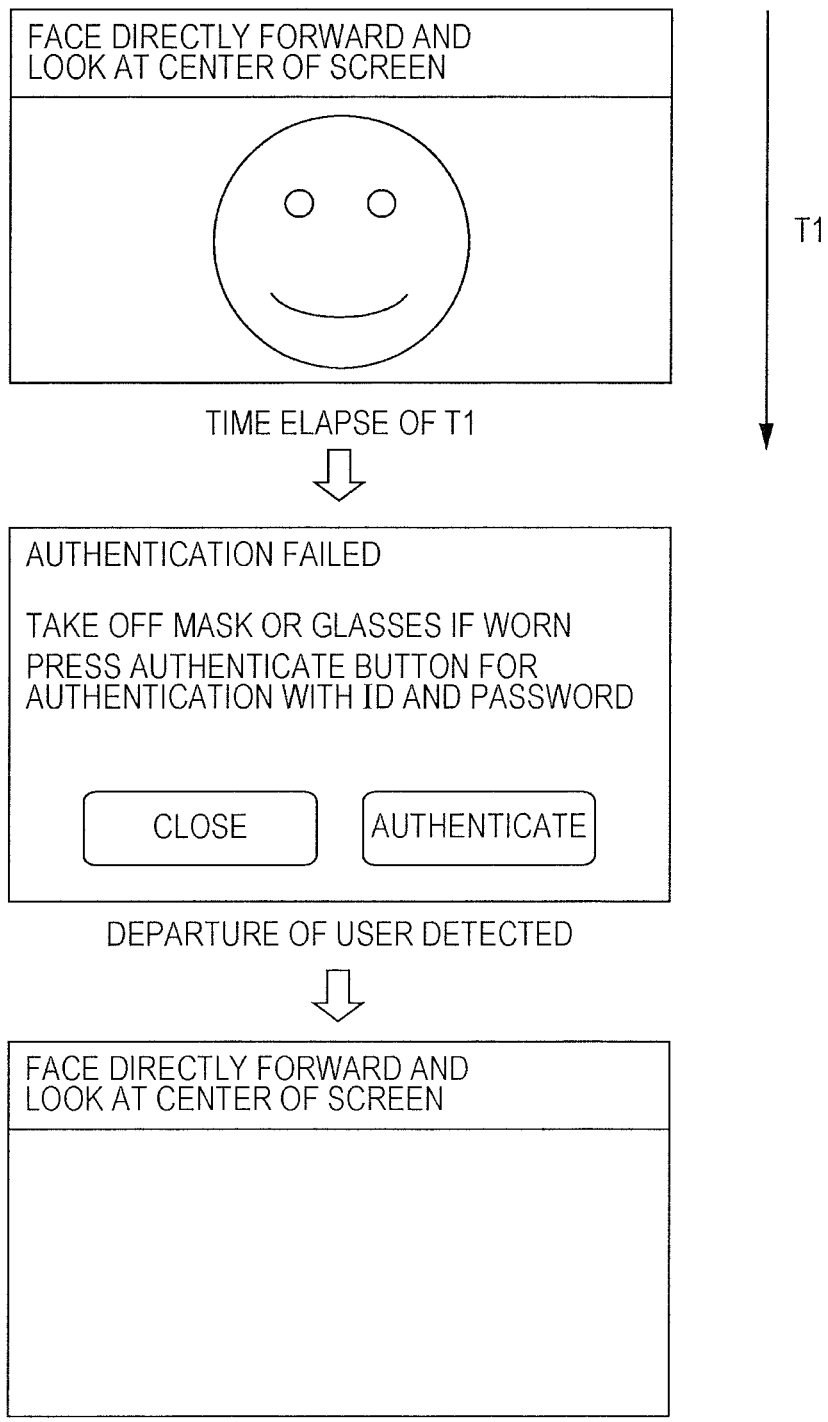
FIG. 6 illustrates another example of the display screens in the face authentication process of the first exemplary embodiment.

FIG. 6 illustrates an example of the display screens in the face authentication process of the first exemplary embodiment. Referring to FIG. 6, a user who has not registered his or her face (face unregistered) requests the face authentication process to be performed with no mask worn.

The first display screen from the top of FIG. 6 is a screen displayed on the touch panel 130 in step S102. The first display screen of FIG. 6 is identical to the first display screen of FIG. 5, and displays a message on the upper portion thereof and a camera image on the lower portion thereof. However, note that the camera image displays the face of the user having no mask worn. In this example, the face is detected from the camera image, and an affirmative determination (yes) is performed in step S104. Since the face of the user is not registered in this case, a non-affirmative determination (no) is performed in step S106.

The second display screen from the top of FIG. 6 is an error screen (error indication) displayed on the touch panel 130 in step S118 if the first set time T1 preset in the error timer started in step S114 has elapsed and the determination in step S116 is affirmative (yes). The error message in the second display screen of FIG. 6 is an example of failure information. The second display screen of FIG. 6 is identical to the second display screen of FIG. 5 except the face of the camera image, and the detailed discussion thereof is thus omitted herein.

The third display screen from the top of FIG. 6 is a screen displayed on the touch panel 130 in step S124 (displayed subsequent to the end of the displaying of the error indication) in response to the affirmative determination (yes) in step S122 subsequent to the non-affirmative determination (no) in step S120. The screen displays the same message to the user as the first display screen of FIG. 6 on the upper portion thereof, and a camera image captured by the second camera 16 on the lower portion thereof. Since the determination in step S122 is affirmative (yes), in other words, no user is present in front of the image forming apparatus 10, the camera image indicates no face.

In the first exemplary embodiment, the touch panel 130 is caused to stop displaying the error message if the departure of the user is detected with the error message displayed on the touch panel 130 to the user. In this way, an error message intended for a previous user is not displayed to a next user who may approach the image forming apparatus 10 in succession to the previous user. As a result, erroneous inputting by the next user is controlled.

In the first exemplary embodiment, the departure of the user from the area in front of the image forming apparatus 10 is detected based on the detection results of the pyroelectric sensor 14, the imaging results of the first camera 15, and the imaging results of the second camera 16. Since the pyroelectric sensor 14 and the first camera 15 are arranged on the front side of the image forming apparatus 10, the detection results of the pyroelectric sensor 14 and the imaging results of the first camera 15 allow the departure of the user to be easily detected. If the imaging results of the second camera 16 are used, the camera image displayed on the touch panel 130 is shared as an image from which the departure of the user is detected. The structure of the image forming apparatus 10 may be simplified.

In accordance with the first exemplary embodiment, the displaying of the error message is stopped when the departure of the user from the image forming apparatus 10 is detected. The present invention is not limited to this configuration. For example, if the departure of the user from the image forming apparatus 10 is detected, the controller 101 may start a power saving control operation in addition to the stopping of the displaying of the error message. The power saving control operation may include causing the touch panel 130 to stop backlighting, and shifting to a power saving mode in which power supplying to some elements of the image forming apparatus 10 is stopped.

Second Exemplary Embodiment

A second exemplary embodiment is partially different in the face authentication process from the first exemplary embodiment. In the second exemplary embodiment, elements identical to those in the first exemplary embodiment are designated with the same reference numerals, and the detailed discussion thereof is omitted herein.

Figure 7:
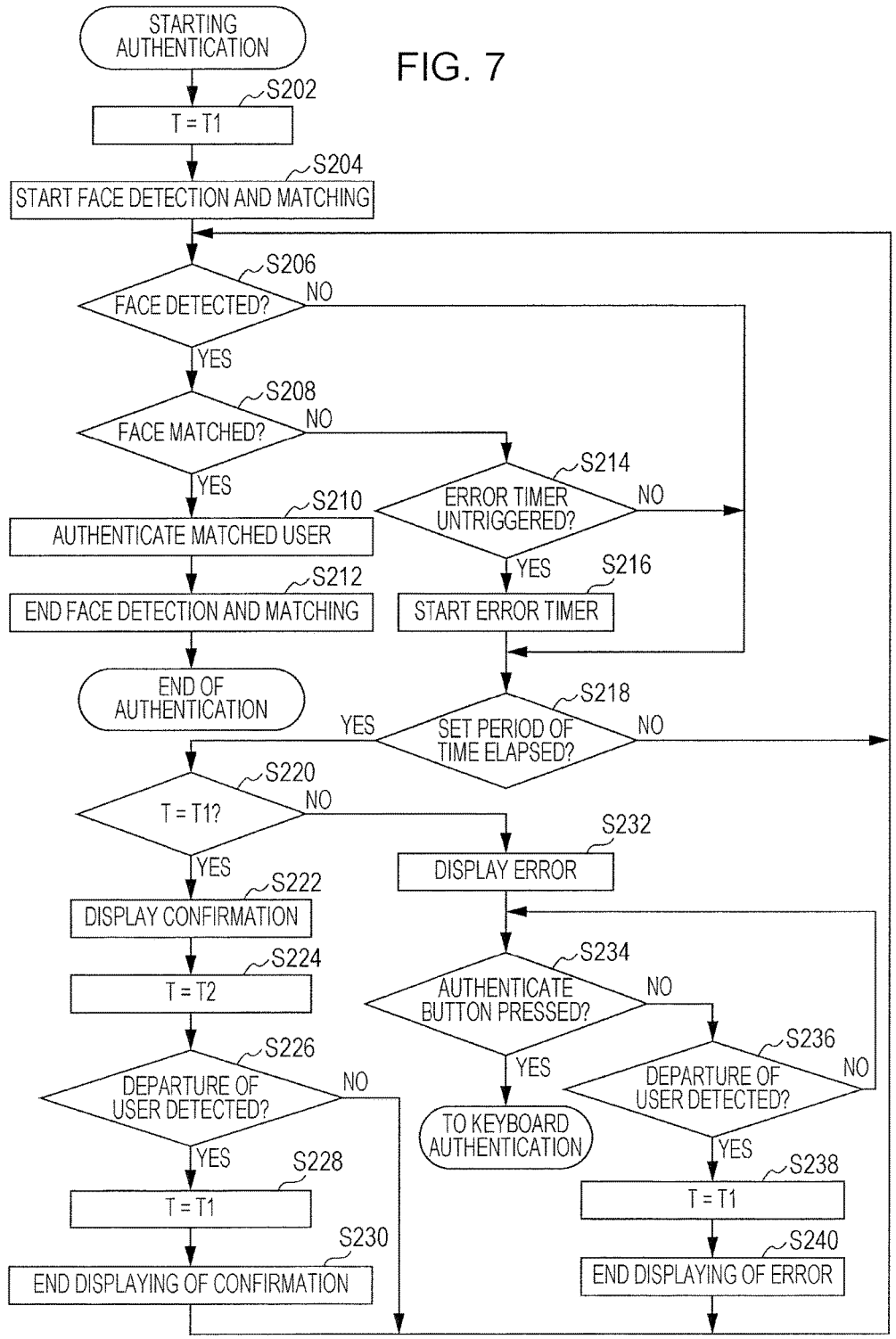
FIG. 7 is a flowchart illustrating the face authentication process of a second exemplary embodiment.

FIG. 7 is a flowchart illustrating the face authentication process of the second exemplary embodiment. The face authentication process is also carried out by the controller 101 and the authenticating unit 109 in the image forming apparatus 10.

The pyroelectric sensor 14 may detect a person (user) in step S1 (see FIG. 11), the first camera 15 may be started in step S2, and the image forming apparatus 10 may shift from the sleep mode to the standard mode in step S5. The face authentication process starts in response to the detection of the presence of a person in step S6. The set period of time T is set to be the first set time T1 (step S202). A face detection and matching process starts in response to the image captured by the second camera 16 (step S204). In step S204, the image captured by the second camera 16 is displayed on the touch panel 130 in the user interface 13. If the face of the user is present within the imaging area of the second camera 16, the camera image includes the face of the user.

The image forming apparatus 10 determines whether the face of the user has been detected (step S206). In response to a non-affirmative determination in step S206 (no branch from step S206), processing proceeds to step S218. In response to an affirmative determination in step S206 (yes branch from step S206), the image forming apparatus 10 checks the feature quantity of the detected face against the feature quantity of the registered face to determine whether there is a match (as to whether face matching is successful or not) (step S208). In response to an affirmative determination (yes) in step S208, the image forming apparatus 10 authenticates the user as a matched user (step S210), and completes the face detection and matching process (step S212). The image forming apparatus 10 thus ends the face authentication process.

In response to a non-affirmative determination (no) in step S208, the image forming apparatus 10 determines whether an error timer using the time measurement unit 110 is untriggered (step S214). In response to an affirmative determination (yes) in step S214, the image forming apparatus 10 starts the error timer with the time setting T (step S216), and proceeds to step S218. On the other hand, in response to a non-affirmative determination (no) in step S214, processing proceeds to step S218.

The image forming apparatus 10 determines whether the set period T of time of the started timer has elapsed (step S218). In response to a non-affirmative determination (no) in step S218, processing returns to step S206 to repeat the process. In response to an affirmative determination (yes) in step S218, the image forming apparatus 10 determines whether the set time T is set to be the first set time T1 (step S220).

If the determination in step S220 is affirmative (yes), the image forming apparatus 10 causes the touch panel 130 to display a confirmation screen (step S222), and sets the time setting T to be a second set time T2 longer than the first set time T1 (T2>T1) (step S224). With the confirmation screen displayed, the image forming apparatus 10 determines whether the departure of the user from the area in front of the image forming apparatus 10 has been detected (step S226). The departure of the user from the image forming apparatus 10 is detected in step S226 based on the detection results of the pyroelectric sensor 14, the imaging results of the first camera 15, or the imaging results of the second camera 16. If the determination in step S226 is non-affirmative (no), processing returns to step S206 to repeat the process.

If the determination in step S226 is affirmative (yes), the time setting T is set to be the first time T1 (step S228). The image forming apparatus 10 causes the touch panel 130 to end the displaying of the confirmation screen (step S230). Processing returns to step S206 to repeat the process.

If the determination in step S220 is non-affirmative (no), the image forming apparatus 10 causes the touch panel 130 to display an error screen different from the confirmation screen (step S232). With the error screen displayed, the image forming apparatus 10 determines whether the authenticate button has been pressed by the user (step S234). If the determination in step S234 is affirmative (yes), the image forming apparatus 10 shifts to keyboard authentication in which authentication is performed using an ID or password manually input by the user. The keyboard authentication is another authentication example different from the face authentication.

If the determination in step S234 is non-affirmative (no), the image forming apparatus 10 determines the departure of the user from the area in front of the image forming apparatus 10 is detected with the error screen displayed (step S236). If the determination in step S236 is non-affirmative (no), processing returns to step S234 to continue the process. If the determination in step S236 is affirmative (yes), the time setting T is set to be the first set time T1. The image forming apparatus 10 causes the touch panel 130 to quit displaying the error screen (step S240). Processing returns to step S206 to repeat the process.

A variety of screen examples displayed on the touch panel 130 in the face authentication process of the second exemplary embodiment are described below.

Figure 8:
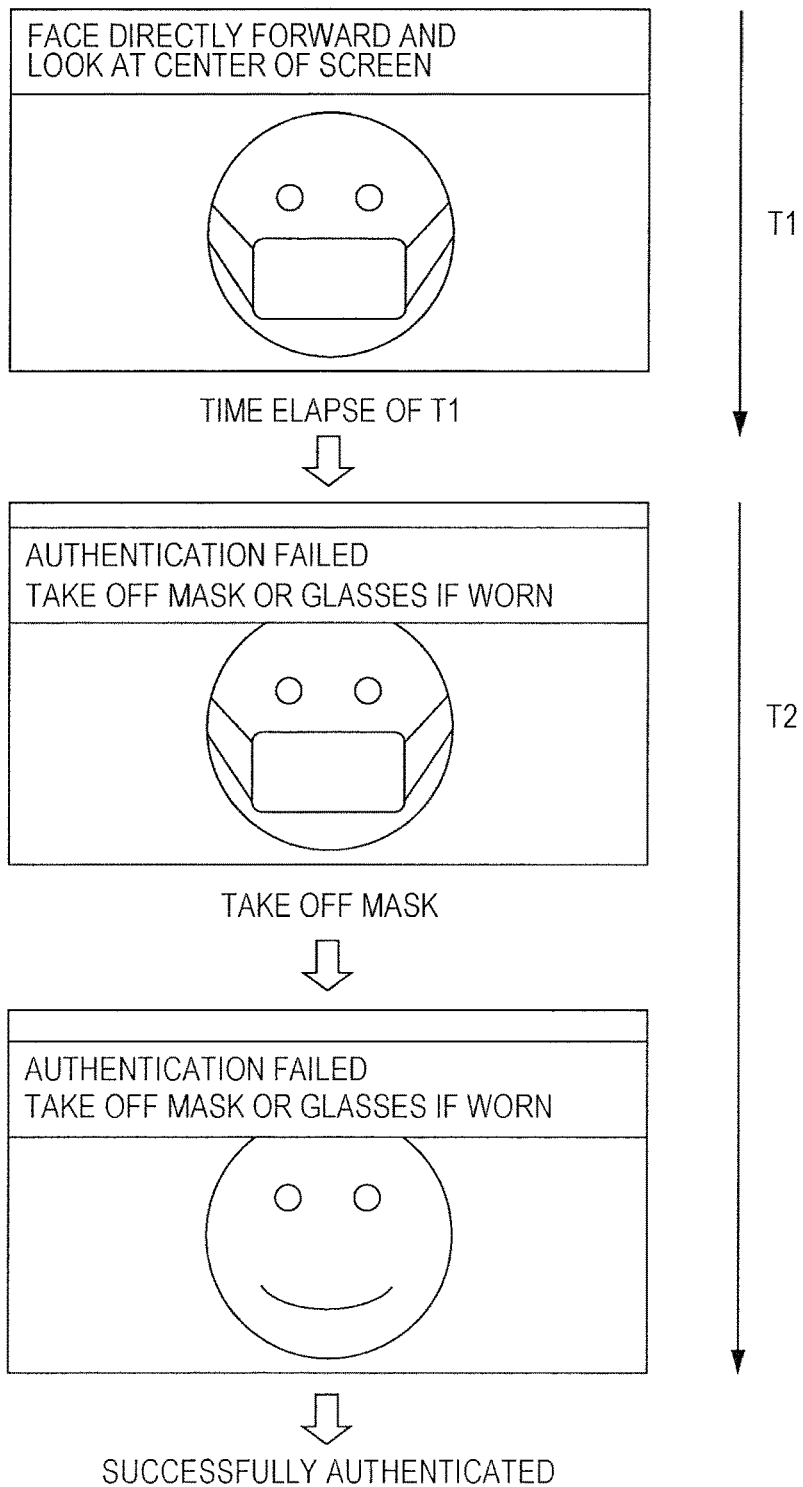
FIG. 8 illustrates an example of display screens in the face authentication process of the second exemplary embodiment.

FIG. 8 illustrates an example of display screens in the face authentication process of the second exemplary embodiment. Referring to FIG. 8, as described with reference to the first exemplary embodiment described with reference to FIG. 5, a user who has completed face registration requests the face authentication to be performed with a mask worn.

The first display screen from the top of FIG. 8 is a screen displayed on the touch panel 130 in step S204. The screen displays a message to the user on the upper portion thereof and a camera image captured by the second camera 16 on the lower portion thereof. The message herein reads "face directly forward and look at center of screen". The camera image displayed herein includes the face of the user with a mask worn. Since the face is not detected from the camera image (because of the worn mask), the determination in step S206 is non-affirmative (no).

The second display screen from the top of FIG. 8 is a confirmation screen displayed on the touch panel 130 in step S222 if the first set time T1 set in step S202 on the error timer started in step S216 elapses, and the determination in step S218 is affirmative (yes), followed by an affirmative determination (yes) in step S220. The screen displays an error message to the user on the upper portion thereof and a camera screen on the lower portion thereof. The error message herein reads "Authentication failed. Take off mask or glasses if worn". In this state, the time setting T is changed from the first set time T1 to the second set time T2 (T2>T1) in step S224. In this example, the first set time T1 is set to be about 5 seconds, and the second set time T2 is set to be about 20 seconds.

The third display screen from the top of FIG. 8 is a screen displayed on the touch panel 130 subsequent to the non-affirmative determination (no) in step S226. The screen displays the same error message to the user as the second display screen of FIG. 8 on the upper portion thereof and a camera image captured by the second camera 16 on the lower portion thereof. Since the user has taken his or her mask off on the confirmation screen in the second display screen of FIG. 8, the camera image includes the face of the user.

The determination in step S206 is affirmative (yes), followed by the affirmative determination (yes) in step S208. The user is thus successfully authenticated and permitted to use the image forming apparatus 10.

Figure 9:
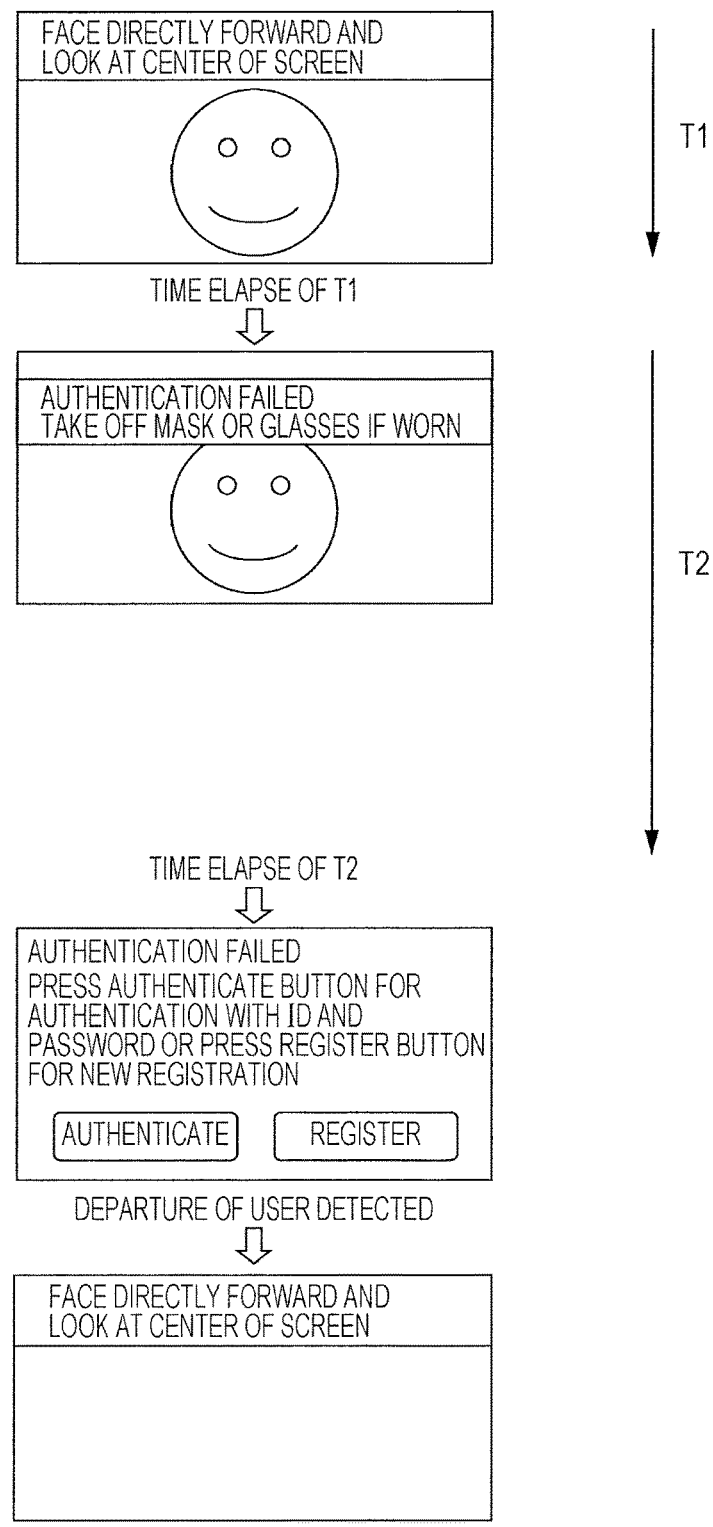
FIG. 9 illustrates another example of the display screens of the face authentication process of the second exemplary embodiment.

FIG. 9 illustrates another example of the display screens of the face authentication process of the second exemplary embodiment. As in the first exemplary embodiment described with reference to FIG. 6, a user who has not registered his or her face (face unregistered) requests the face authentication with no mask worn.

The first display screen from the top of FIG. 9 is a screen displayed on the touch panel 130 in step S204. The first display screen of FIG. 9 is identical to the first display screen of FIG. 8. The screen displays a message on the upper portion thereof and a camera image on the lower portion thereof. The camera image includes the face of the user with no mask worn. The face is thus detected from the camera image, and the determination in step S206 is affirmative (yes). Since the face of the user is not registered on the other hand, the determination in step S208 is non-affirmative (no).

The second screen from the top of FIG. 9 is a confirmation screen displayed on the touch panel 130 in step S222 if the first set time T1 set in step S202 on the error timer started in step S216 elapses, and the determination in step S218 is affirmative (yes), followed by the affirmative determination in step S220. An error message in the second screen of FIG. 9 is an example of the failure information. The second screen of FIG. 9 is similar to the second screen of FIG. 8, and the detailed discussion thereof is omitted herein. In this state, the time setting T is changed from the first set time T1 to the second set time T2 (T2 >T1) in step S224.

The third screen from the top of FIG. 9 is an error screen displayed on the touch panel 130 in step S232 if the determination in step S220 is non-affirmative (no) with the time setting T set to the second set time T2 in step S224. The error message in the third screen of FIG. 9 is another example of the failure information. The screen displays a message to the user on the upper portion thereof, a "close button" on the lower left portion thereof, and a "register button" on the lower right portion thereof. The message herein reads "Authentication failed. Press authenticate button for authentication with ID and password or press register button for registration". If the authenticate button is pressed by the user, the determination in step S234 is affirmative (yes).

The fourth screen from the top of FIG. 9 is a screen (subsequent to the end of the error indication) displayed on the touch panel 130 in step S240 if the determination in step S234 is non-affirmative (no), followed by the affirmative determination (yes) in step S236. The screen displays the same message to the user as the first screen of FIG. 9 on the upper portion thereof, and a camera image captured by the second camera 16. Note that the determination in step S236 is affirmative (yes). Since no user is present in front of the image forming apparatus 10, no user's face is included in the camera image.

In the second exemplary embodiment, the face authentication process continues if the "confirmation screen" is displayed in step S222. In contrast, the face authentication process is suspended if the "error screen" is displayed in step S232.

As described above, the image forming apparatus 10 causes the touch panel 130 to stop displaying the error message if the departure of the user is detected with the error message displayed on the touch panel 130. In this way, an error message intended for a previous user is not displayed to a next user who may approach the image forming apparatus 10 in succession to the previous user. As a result, erroneous inputting by the next user is controlled.

In accordance with the second exemplary embodiment, a first error message (confirmation screen) including information related to the face authentication is displayed to the user, and then, a second error message (error screen) including information related to authentication other than the face authentication is displayed to the user. The user is thus allowed to be authenticated in a different authentication method.

In accordance with the second exemplary embodiment, the first error message (confirmation screen) is displayed after the time elapse of the first set time T1, and the second error message (error screen) is displayed after the time elapse of the second set time T2 longer than the first set time. Since the first error message is displayed with the first set time T1 elapsed, the user has time to adjust how the user's face is captured, before the suspension of the face authentication. The second set time T2 longer than the first set time T1 makes it more difficult for the authentication method to simply return back to the face authentication method. Note that the user may desire to be authenticated in an authentication method other than the face authentication method or may desire to register the face image.

In each of the exemplary embodiments, the authentication is performed by checking the face image of the user captured by the second camera 16 against the face image of the registered user. As long as the face image captured from the user is used, a variety of authentication techniques may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication apparatus comprising:
   at least one hardware processor configured to implement:
      capturing a face image of a user;
      authenticating the user using the face image;
      displaying failure information if authentication of the user is unsuccessful;
      detecting a departure of the user; and
      in response to detecting the departure after unsuccessfully authenticating the user, stopping a display of the failure information by changing the display of the failure information to a display of authentication information.

2. The authentication apparatus according to claim 1, wherein the at least one hardware processor is further configured to implement: detecting the departure by an infrared sensor that detects an infrared ray or a camera that captures an image.

3. The authentication apparatus according to claim 2, wherein the at least one hardware processor is further configured to implement: controlling power consumption to a lower value in response to detecting the departure of the user.

4. The authentication apparatus according to claim 3, wherein the at least one hardware processor is further configured to implement:
   detecting the face image of the user from the face image;
   measuring a time period elapsed from the detection of the face image of the user; and
   displaying the failure information if the authentication of the user is uncompleted with the elapsed time period having exceeded a first time period.

5. The authentication apparatus according to claim 2, wherein the at least one hardware processor is further configured to implement:
   detecting the face image of the user from the face image;
   measuring a time period elapsed from the detection of the face image of the user; and
   displaying the failure information if the authentication of the user is uncompleted with the elapsed time period having exceeded a first time period.

6. The authentication apparatus according to claim 5, wherein the at least one hardware processor is further configured to implement:
   displaying a first failure information if the authentication of the user is uncompleted with the elapsed time period having exceeded the first time period; and
   displaying a second failure information different from the first failure information if the authentication of the user is uncompleted with the elapsed time period having exceeded a second time period, and
   the second time period is longer than the first time period.

7. The authentication apparatus according to claim 1, wherein the at least one hardware processor is further configured to implement: controlling power consumption to a lower value in response to detecting the departure of the user.

8. The authentication apparatus according to claim 7, wherein the at least one hardware processor is further configured to implement:
   detecting the face image of the user from the face image;
   measuring a time period elapsed from the detection of the face image of the user; and
   displaying the failure information if the authentication of the user is uncompleted with the elapsed time period having exceeded a first time period.

9. The authentication apparatus according to claim 1, wherein the at least one hardware processor is further configured to implement:

detecting the face image of the user from the face image;
measuring a time period elapsed from the detection of the face image of the user; and
displaying the failure information if the authentication of the user is uncompleted with the elapsed time period having exceeded a first time period.

10. The authentication apparatus according to claim 9, wherein the at least one hardware processor is further configured to implement:
displaying a first failure information if the authentication of the user is uncompleted with the elapsed time period having exceeded the first time period; and
displaying a second failure information different from the first failure information if the authentication of the user is uncompleted with the elapsed time period having exceeded a second time period, and
the second time period is longer than the first time period.

11. The authentication apparatus according to claim 10, wherein the failure information includes information related to authentication using the face image, and wherein the second failure information includes information related to second authentication different from the authentication using the face image.

12. The authentication apparatus according to claim 11, wherein the second authentication is based on an input entered by the user.

13. The authentication apparatus according to claim 10, wherein the at least one hardware processor is further configured to implement:
resetting the second time period to the first time period in response to detecting the departure of the user during the second time period.

14. The authentication apparatus according to claim 10, wherein the at least one hardware processor is further configured to implement displaying second failure information instructing removal of an object from a face of the user, the object obscuring the face of the user during the first time period.

15. The authentication apparatus according to claim 1, wherein the display of the authentication information comprises display of an authentication instruction.

16. The authentication apparatus according to claim 1, wherein detecting the departure comprises detecting that the user has departed a presence sense area which is within and narrower than an approach sensing area in front of the authentication apparatus, and
the authentication apparatus is configured to supply power to a second camera configured to capture the face image in response to a first camera detecting the user in the presence sense area,
the authentication apparatus is configured to supply power to the first camera in response to a pyroelectric sensor sensing the user, and
the pyroelectric sensor is configured to sense the user in a state in which the first camera and the second camera are not supplied power.

17. The authentication apparatus according to claim 1, wherein the at least one hardware processor is further configured to implement:
in response to determining that a close button displayed with the failure information is not pressed, determining whether to stop the display of the failure information in response to the departure being detected.

18. The authentication apparatus according to claim 1, wherein the at least one hardware processor is further configured to implement:
detecting the departure of the user in a state in which the authentication of the user failed.

19. The authentication apparatus according to claim 1, wherein the at least one hardware processor is further configured to implement:
setting the authentication apparatus to a sleep mode after in response to detecting the departure of the user and after a period of time, initially set in response to detecting the user within a predetermined range from the authentication apparatus.

20. An image forming apparatus, comprising:
at least one hardware processor configured to implement:
forming an image on a recording material;
capturing a face image of a user;
authenticating the user using the face image and permitting the user to use the image forming apparatus in response to the authenticating;
displaying failure information if authentication is unsuccessful;
detecting a departure of the user; and
in response to detecting the departure after unsuccessfully authenticating the user, stopping a display of the failure information by changing the display of the failure information to a display of authentication information.

21. An authentication method comprising:
capturing a face image of a user;
authenticating the user using the captured face image;
displaying failure information if authentication of the user is unsuccessful;
detecting a departure of the user; and
in response to detecting the departure after unsuccessfully authenticating the user, stopping a display of the failure information by changing the display of the failure information to a display of authentication information.

22. An image forming method, comprising:
forming an image on a recording material;
capturing a face image of a user;
authenticating the user using the captured face image and permitting the image to be formed;
displaying failure information if the authenticating is unsuccessful;
detecting a departure of the user; and
in response to detecting the departure after unsuccessfully authenticating the user, stopping a display of the failure information by changing the display of the failure information to a display of authentication information.

23. An authentication apparatus comprising:
at least one hardware processor configured to implement:
capturing a face image of a user;
authenticating the user using the face image;
displaying failure information if authentication of the user is unsuccessful;
detecting a departure of the user;
stopping a display of the failure information in response to detecting the departure after unsuccessfully authenticating the user;
detecting the face image of the user from the face image;
measuring a time period elapsed from the detection of the face image of the user;
displaying a first failure information if the authentication of the user is uncompleted with the elapsed time period having exceeded a first time period; and
displaying a second failure information different from the first failure information if the authentication of the user is uncompleted with the elapsed time period having exceeded a second time period, and the second time period is longer than the first time period.

* * * * *